United States Patent
Cho et al.

(10) Patent No.: US 9,378,092 B2
(45) Date of Patent: Jun. 28, 2016

(54) STORAGE CONTROL APPARATUS AND STORAGE CONTROL METHOD

(71) Applicant: FUJITSU LIMITED, Kawasaki-shi, Kanagawa (JP)

(72) Inventors: Emi Cho, Yokohama (JP); Toshihiko Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 14/551,130

(22) Filed: Nov. 24, 2014

(65) Prior Publication Data
US 2015/0169409 A1   Jun. 18, 2015

(30) Foreign Application Priority Data

Dec. 18, 2013 (JP) .................. 2013-261803

(51) Int. Cl.
G06F 11/00 (2006.01)
G06F 11/10 (2006.01)

(52) U.S. Cl.
CPC .......... G06F 11/1088 (2013.01); G06F 11/108 (2013.01); *G06F 2211/1059* (2013.01)

(58) Field of Classification Search
CPC . G06F 11/1088; G06F 11/10; G06F 12/0646; G06F 11/006
See application file for complete search history.

(56) References Cited

U.S. PATENT DOCUMENTS

| | | | | |
|---|---|---|---|---|
| 6,223,252 B1* | 4/2001 | Bandera | ............... | G06F 11/2069 711/112 |
| 7,237,062 B2* | 6/2007 | Lubbers | ................ | G06F 3/0619 711/114 |
| 7,613,984 B2* | 11/2009 | Goel | ................... | G06F 11/1076 714/770 |
| 7,721,146 B2* | 5/2010 | Polisetti | .............. | G06F 11/1076 714/42 |
| 7,979,779 B1* | 7/2011 | Goel | ................... | G06F 11/1076 714/770 |
| 8,484,506 B2* | 7/2013 | Kumar | ................ | G06F 11/1076 711/114 |
| 8,560,922 B2* | 10/2013 | Bivens | ................... | G11C 29/42 714/763 |
| 2010/0161883 A1 | 6/2010 | Kurashige | | |
| 2010/0251013 A1* | 9/2010 | Yao | ..................... | G06F 11/1076 714/6.32 |
| 2012/0304016 A1 | 11/2012 | Fujihara | | |

FOREIGN PATENT DOCUMENTS

| | | |
|---|---|---|
| JP | 2010-152551 | 7/2010 |
| JP | 2012-247817 | 12/2012 |

* cited by examiner

*Primary Examiner* — Esaw Abraham
(74) *Attorney, Agent, or Firm* — Fujitsu Patent Center

(57) ABSTRACT

An apparatus includes an interface, and a processor. The interface inputs and outputs data from and to a storage device that includes a plurality of memory blocks forming a plurality of RAID groups, and a backup block used as a backup of the plurality of memory blocks. The processor sets as read-out targets a plurality of memory cells included in each memory block. When a memory cell included in a faulty memory block becomes a read-out target, the processor excludes the memory cell that belongs to the RAID group, until restoration of the data of the faulty memory block and copying of the restored data to the backup block are completed. When the copying of the restored data is completed, the processor selects as read-out targets the memory cell that belongs to the RAID group that includes the faulty memory block and a memory cell in the backup block.

5 Claims, 15 Drawing Sheets

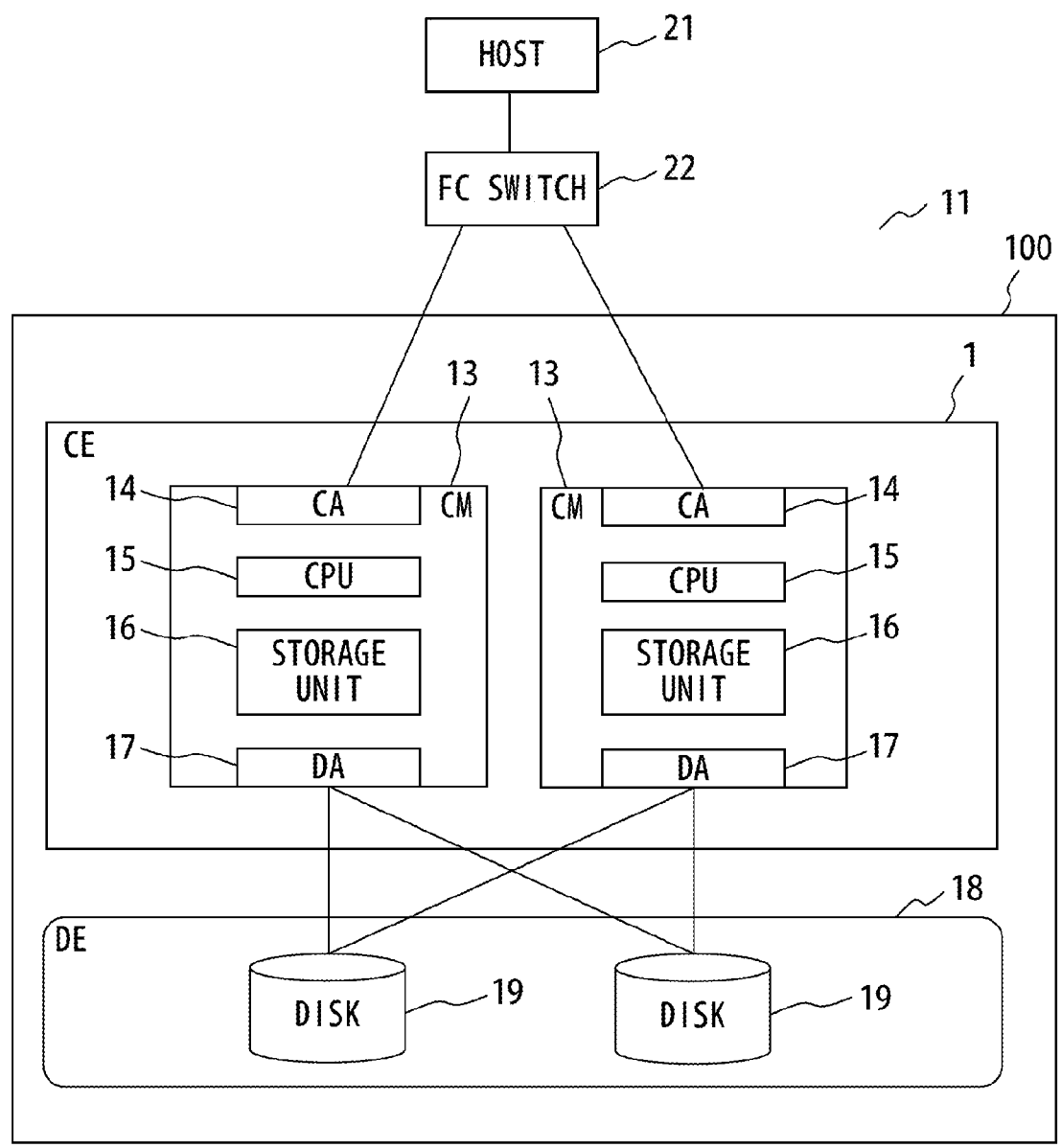
F I G. 2

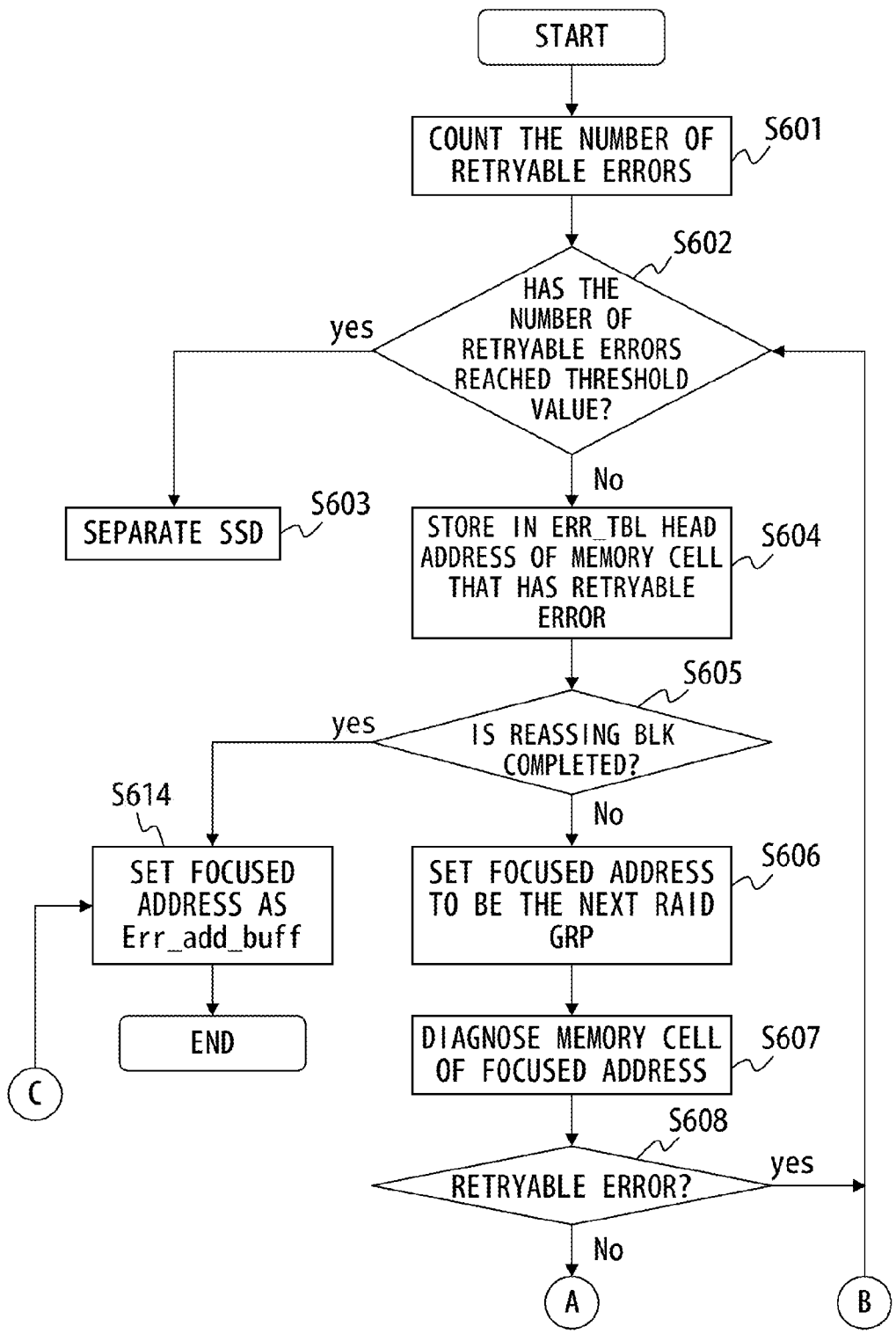
F I G. 1 0 A

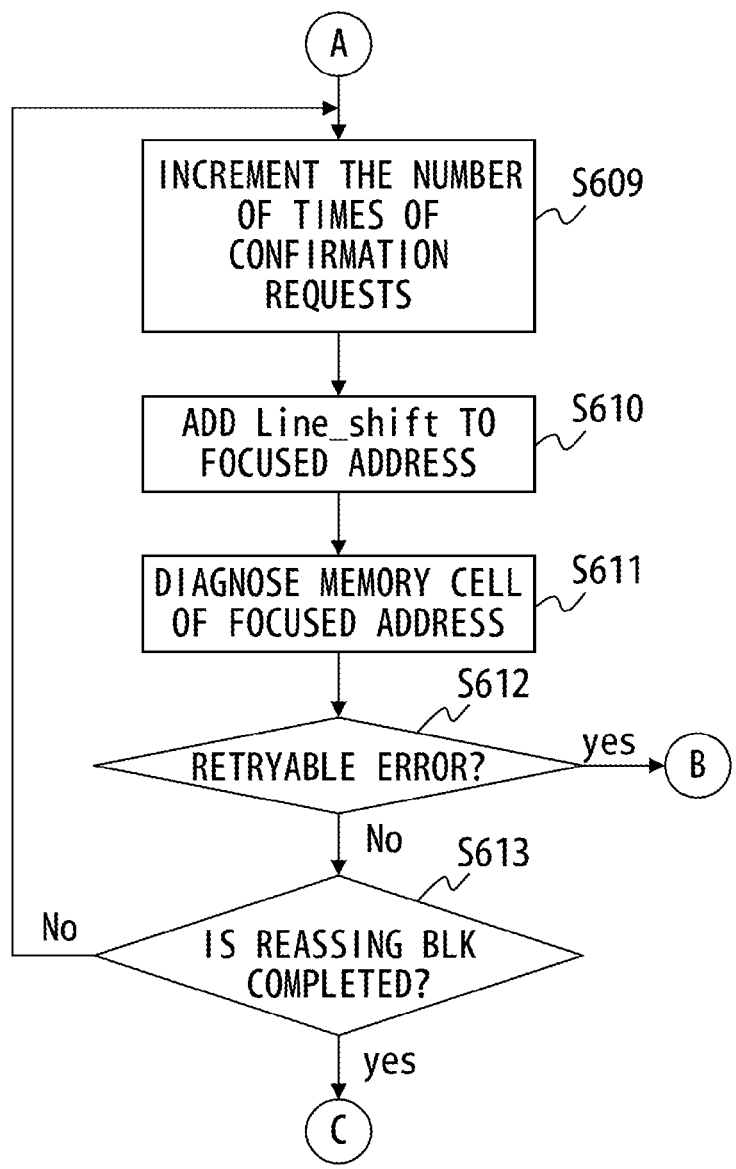
F I G. 10B

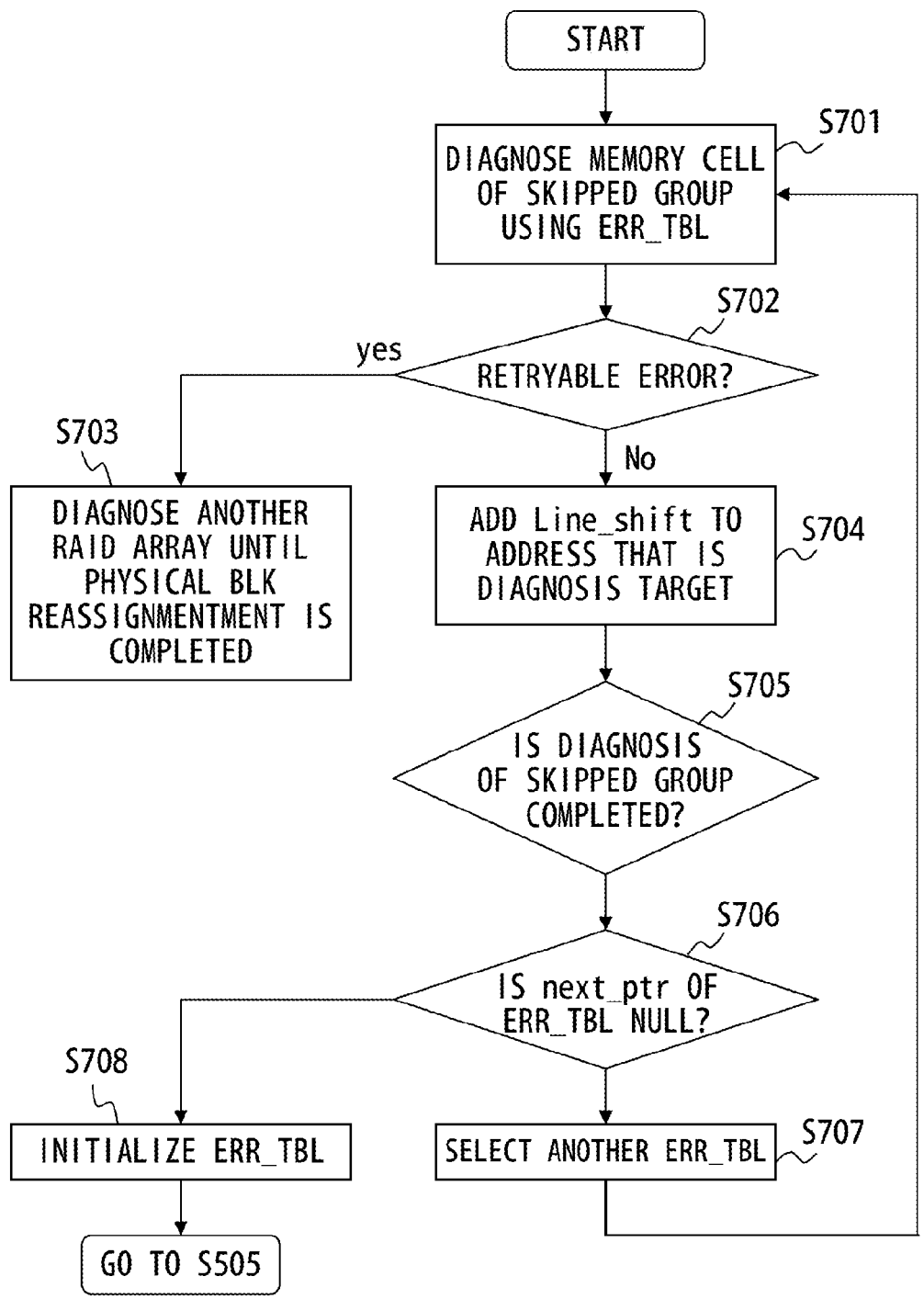
F I G. 11

STORAGE CONTROL APPARATUS AND STORAGE CONTROL METHOD

CROSS-REFERENCE TO RELATED APPLICATIONS

This application is based upon and claims the benefit of priority of the prior Japanese Patent Application No. 2013-261803, filed on Dec. 18, 2013, the entire contents of which are incorporated herein by reference.

FIELD

The embodiments discussed herein are related to a method for reading out data from a memory.

BACKGROUND

A server device is mounted with an SSD (Solid-State Drive) and an HDD (Hard Disk Drive) as a storage device. The HDD is a storage device that rotates at high speed a disk-shaped disk coated with a magnetic substance and moves a magnetic head, and thus reads out information stored in the disk. The SSD is a storage device that uses a NAND-type flash memory as a storage medium. The server device has a patrol-read function that performs a normality diagnosis of a medium by reading each memory such as the SSD and the HDD.

The SSD has a plurality of memory blocks (blocks). Each memory block has a plurality of pages. In addition, each page has a plurality of memory cells. A control unit that controls processing of the normality diagnosis diagnoses normality in units of memory cells. The control unit specifies the head address of a memory cell that is a diagnosis target. The SSD reads out data from the memory cell that includes the specified address, and sends back the data to the control unit. When the control unit receives the data of the memory cell that includes the specified address from the SSD, the control unit determines that the memory cell is normal. The control unit sequentially specifies the head addresses of memory cells on which the normality diagnosis has not yet been performed, and the normality diagnosis is also performed on the remaining memory cells. When the SSD cannot read data from the memory cell that includes the specified address, the SSD notifies the control unit that the memory cell is faulty.

In the storage device that uses a NAND-type flash memory such as the SSD, a failure in units of blocks occurs due to aging deterioration, etc. A failure due to deterioration is anticipated in advance. Therefore, the medium such as the SSD has a backup block. The control unit regards a block in which a failure has occurred as a faulty block, and replaces the faulty block with the backup block. The SSD maintains the initial capacity of the medium by replacing the capacity of the faulty block with that of the backup block.

In order to replace the faulty block with the backup block, the control unit recovers data stored in the faulty block, and then arranges the recovered data in the backup block. Examples of methods for recovering data include an ECC (Error-Correcting Code) and a RAID (Redundant Array of Inexpensive Discs). Such a restorable error is referred to as a retryable error.

A technique for setting NAND memory blocks as one group, and creating parity data and writing it as nth data every time n-1th data is written is known as a technique for data restoration in the SSD. (See, for example, Patent document 1)

A technique for diagnosing the address that is an access target and executing sequential read on the basis of a request from outside is known as a technique related to patrol read. (See, for example, Patent document 2)

Patent Document 1: Japanese Laid-open Patent Publication No. 2010-152551
Patent Document 2: Japanese Laid-open Patent Publication No. 2012-247817

SUMMARY

According to an aspect of the embodiments, a storage control apparatus includes an interface and a processor. The interface inputs and outputs data to and from a storage device that includes a plurality of memory blocks that create a plurality of RAID groups, and that further includes a backup block used as a backup of the plurality of memory blocks. When the processor sets a plurality of memory cells included in each memory block in the storage device as read-out targets, the processor sometimes selects a memory cell included in a faulty memory block as a read-out target. Then, the processor excludes the memory cell that belongs to the RAID group having the faulty memory block from the read-out targets until restoration of data of the faulty memory block and copying of restored data in the backup block are completed. At the same time, the processor selects a memory cell of a group other than the RAID group having the faulty memory group as a read-out target. When the restoration of the data of the faulty memory block and copying of the restored data in the backup block is completed, the processor selects the memory cell that belongs to the RAID group having the faulty memory block and a memory cell in the backup block as read-outs targets.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating one example of a storage system in the embodiments.

FIG. 10A is a flowchart explaining normality diagnosis processing that is performed until the arrangement of restored data in a backup block is completed.

FIG. 10B is a flowchart explaining normality diagnosis processing that is performed until the arrangement of the restored data in the backup block is completed.

FIG. 11 is a flowchart explaining an example of processing for performing the normality diagnosis on a group for which the normality diagnosis is skipped.

DESCRIPTION OF EMBODIMENTS

As one example, a case in which a block that has three memory cells, i.e., a memory cell A, a memory cell B, and a memory cell C, is faulty is considered. The failure of the block is a retryable error. When a control unit performs a normality diagnosis and specifies the head address of the memory A, an SSD cannot read data stored in the memory cell A and detects the failure. The SSD notifies the control unit that the block is faulty. The SSD executes processing for recovering data of the faulty block and arranging the recovered data in a backup block. On the other hand, the control unit starts the normality diagnosis of the next memory cell B without interrupting normality diagnosis processing. When the data recovery of the faulty block and the arrangement of the recovered data in the backup block are not completed, the SSD cannot read the data stored in the memory cell B, detects that the block is faulty, and notifies the control unit of it. Thereafter, the control unit continues performing the normality diagnosis on the memory C. Then, the SSD cannot read the data stored in the memory cell C, detects that the block is faulty, and notifies the control unit of it.

When the normality diagnosis is performed on a faulty block, the control unit is notified of a plurality of errors until the data recovery of the faulty block and the arrangement of the recovered data in the backup block are completed, after a first memory cell is diagnosed. When a predetermined number of errors are detected, the control unit determines that the SSD is a troubled storage device, and will not use the SSD thereafter. However, even when one block is faulty, if the failure is a retryable error, data is restored and a backup area is used as a replacement, so there is no influence on the function of the SSD after the data is restored. As described above, there are cases in which the control unit determines that the SSD is a troubled storage device, as a function of the SSD, even if the failure is a retryable error that is supposed to be acceptable. In one aspect, the object of the embodiments is to efficiently perform the normality diagnosis.

Hereinafter, the embodiments will be described in detail with reference to the drawings.

Figure 1:
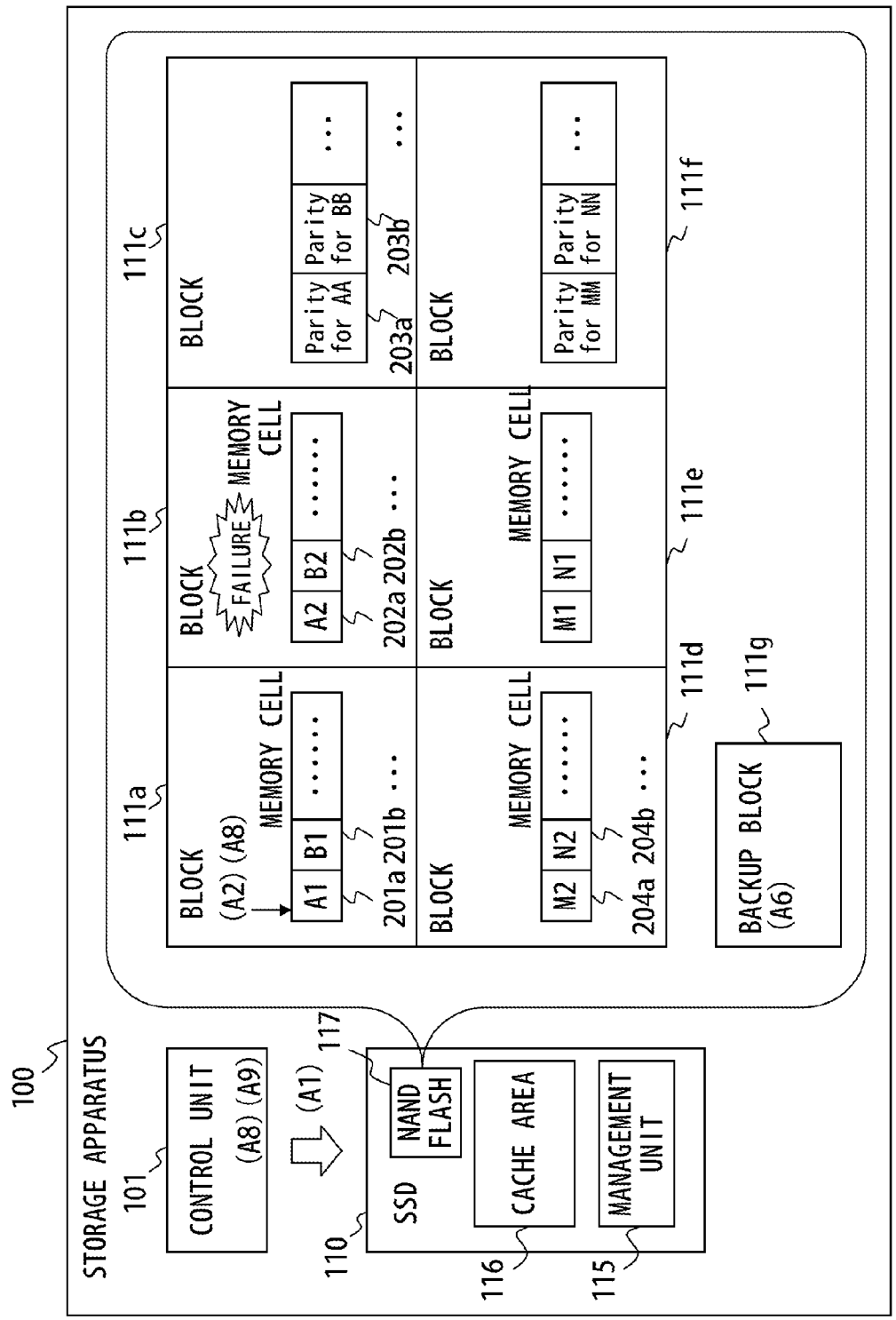
FIG. 1 is a diagram explaining an example of normality diagnosis processing related to embodiment 1.

FIG. 1 is a diagram explaining an example of the normality diagnosis processing related to embodiment 1. A storage apparatus 100 in FIG. 1 includes a control unit 101 and an SSD 110. The control unit 101 controls the normality diagnosis processing on the SSD. The SSD 110 is a storage device that uses an NAND flash memory 117 as a storage medium, and includes a plurality of blocks 111 (111a to 111f) and a backup block 111g. The block 111 includes a plurality of memory cells that are memory management units. The SSD 110 includes a management unit 115. The management unit 115 manages data stored in each block in the SSD 110.

As one example, the block 111a, the block 111b, and the block 111c of the SSD 110 in FIG. 1 are one group. The group can hold data, for example, by using a RAID 5. Therefore, when there is original data AA, the management unit 115 divides the data AA into two pieces of data, i.e., A1 and A2, and creates parity for the data AA. The management unit 115 stores parity data for the data A1, A2, and AA in the block 111a, the block 11b, and the block 111c, respectively. Similarly, the management unit 115 divides data BB into two pieces of data, i.e., B1 and B2, and creates parity for the data BB. The management unit 115 stores parity data for the data B1, B2, and BB in the block 111a, the block 111b, and the block 111c, respectively. The data AA and the data BB are different data.

Data such as A1, B1, and the parity are held in a memory cell in each block. The memory cell 201a in the block 111a holds the data A1, and the memory cell 201b holds the data B1. The memory cell 202a of the block 111b holds the data A2, and the memory cell 202b holds the data B2. The memory cell 203a of the block 111c holds the parity for the data AA, and the memory cell 203b holds the parity for BB. The block 111d, the block 111e, and the block 111f are one group. The blocks 111d to 111f hold M1 and M2 obtained by dividing MM, and parity for the data MM. The blocks 111d to 111f hold N1 and N2 obtained by dividing NN, and parity for the data NN. As a result, the group of the blocks 111a to 111c, and the group of the blocks 111d to 111f store different data.

Hereinafter, an example of the normality diagnosis processing related to embodiment 1 when the block 111b is faulty will be described in order. The normality diagnosis executes processing in order in units of memory cells.

(A1) The control unit 101 starts the normality diagnosis of the SSD 110.

(A2) The control unit 101 specifies the head address of the memory cell 201a of the block 111a, and notifies the management unit 115 of the read-out request of the data held by the memory cell that includes the specified address.

(A3) The management unit 115 reads out the data in the memory cell 201a in a cache area 116. In addition, in order to maintain the consistency of the RAID, the management unit 115 reads out the data A2 divided from AA that is the original data of A1 and the parity data in the cache area 116 of the SSD 110.

However, since the block 111b is faulty, the SSD 110 cannot read out the data A2 from the block 111b.

(A4) The management unit 115 detects that the data cannot be read out from the block 111b.

(A5) The management unit 115 determines whether or not the detected failure is a retryable error. The determination on whether or not the detected failure is a retryable error is made on the basis of whether or not the data stored in the block 111 that includes the data A2 can be restored using the parity of an ECC or the RAID. The management unit 115 notifies the control unit 101 of the occurrence of the retryable error.

(A6) When the detected error is a retryable error, the management unit 115 restores the data of the block 111b, and arranges the data in the backup block 111g. The data arranged in the backup block 111g is stored while the same address as that of the block 111b is specified therefor.

(A7) The control unit 101 skips the normality diagnosis of the group that includes the faulty block 111b. The control unit 101 continues the normality diagnosis with respect to the group that does not include the faulty block 111b. For example, the control unit 101 sequentially specifies the head addresses of the memory cells in order of, for example, the memory cell 204a and the memory cell 204b of the block 111d, and gives a notification of the read-out request of the data held by the memory cell that includes the specified address. The management unit 115 transmits to the control unit 101 the data of the memory cell that includes the specified address. The control unit 101 determines that the memory cell that includes the specified address is normal.

(A8) The control unit 101 determines whether or not the normality diagnosis of all the blocks other than the group subjected to skip processing is completed. When the control unit 101 determines that the normality diagnosis of all the blocks other than the group subjected to skip processing is completed and the arrangement of the data in the backup block 111g is completed, the control unit performs the normality diagnosis on the group (the blocks 111a to 111c) subjected to skip processing. When the management unit 115 reads out the data held by the block 111b, the management unit reads out the data from the backup block 111g as an alternative.

(A9) When the normality diagnosis of all the blocks 111 is completed, the control unit 101 terminates the normality diagnosis processing.

When, as a result of (A5), the detected failure is not the retryable error, the control unit 101 does not perform processing in (A6) and (A8). When the control unit 101 detects a faulty block in the normality diagnosis in (A7), the control unit repeats the processing from (A5). The SSD in FIG. 1 does not limit the number of the blocks and the number of the memory cells. The data such as A1 to A2 is one example, and does not limit the data in any way. Although three blocks such as the block 111a, the block 111b, and the block 111c are set as one group in embodiment 1, a greater plurality of blocks may be set as one group.

Since the normality diagnosis processing for a group that includes a block in which a failure is detected is skipped, an error is detected in the normality diagnosis for a group that includes a faulty block once. As a result, even when a faulty block is diagnosed, since normality diagnosis is not performed a plurality of times on the faulty block, error detection is not performed a plurality of times on one block.

FIG. 2 illustrates one example of a storage system in the embodiments. The storage system 11 is a disk storage system mounted with a plurality of disk devices 19. With respect to an access from a host computer (hereinafter referred to as a host) 21 to the disk device 19, two access paths exist for each disk device 19 for redundancy. As for data itself, data is dispersed in a plurality of disks using the RAID, and is stored in a redundant state.

The storage system 11 includes the host computer (hereinafter referred to as the host) 21, a fiber channel (FC) switch 22, a controller enclosure (CE) 12, and a drive enclosure (DE) 18. In the storage system 11, the drive enclosure (DE) 18 and the host 21 are connected to each other via the FC switch 22 and controller modules (CM) 13.

The host 21 communicates with the controller enclosure (CE) 12 via the FC switch 22, and reads out data from the disk device 19 included in the drive enclosure (DE) 18 or writes data in the disk device 19. In FIG. 2, the one host 21 is illustrated; however, a plurality of hosts 21 may be connected to the controller enclosure (CE) 12.

The controller enclosure (CE) 12 includes the plurality of controller modules (CMs) 13. The controller module 13 controls operation of the disk device 19. Each controller module 13 functions as a storage control apparatus. Since the storage system 11 includes two or more controller modules (CMs) 13 used for operation, redundancy is secured.

The controller module (CD) 13 transmits to the drive enclosure (DE) 18 an input/output (I/O) command as access instruction information, and gives an input/output command of data with respect to the storage area of the disk device 19. When the controller module (CM) 13 cannot receive a response after an access monitoring time has passed from the input/output command, the controller module transmits to the drive enclosure (DE) 18 an abort instruction command that interrupts I/O processing.

The controller module 13 includes a channel adapter (CA) 14, a central processing unit (CPU) 15, a storage unit 16, and a device adapter (DA) 17. The channel adapter (CA) 14, the CPU 15, the storage unit 16, and the device adapter (DA) 17 are connected to one another via an internal bus. The CPU 15 operates as the control unit 101.

The channel adapter (CA) 14 is connected to the host 21 via the FC switch 22. The CPU 15 controls the whole of the controller module 13.

The storage unit 16 is a device that records information on for example a cache memory, a ROM (Read Only Memory), or a RAM (Random Access Memory). The storage unit 16 stores data used for operating the controller module 13, a program related to the embodiments, and data etc. used for the embodiments.

The device adapter (DA) 17 is connected to the drive enclosure (DE) 18. The CPU 15 transmits and receives data between the drive enclosure (DE) 18 and itself via the device adapter 17.

The drive enclosure (DE) 18 is formed of one or more drive enclosures (DEs). The drive enclosure (DE) 18 includes the plurality of disk devices 19, and has a RAID configuration that takes redundancy into consideration. The disk device 19 is not limited to a hard disk drive (HDD), and for example, an SSD (Solid State Drive) or a magneto-optical disk is possible. In the embodiments, the disk device 19 is used as one example of the storage device, but the embodiments are not limited to this, and a storage device is possible for which either an access method of a random access or a sequential access is possible.

Figure 3:
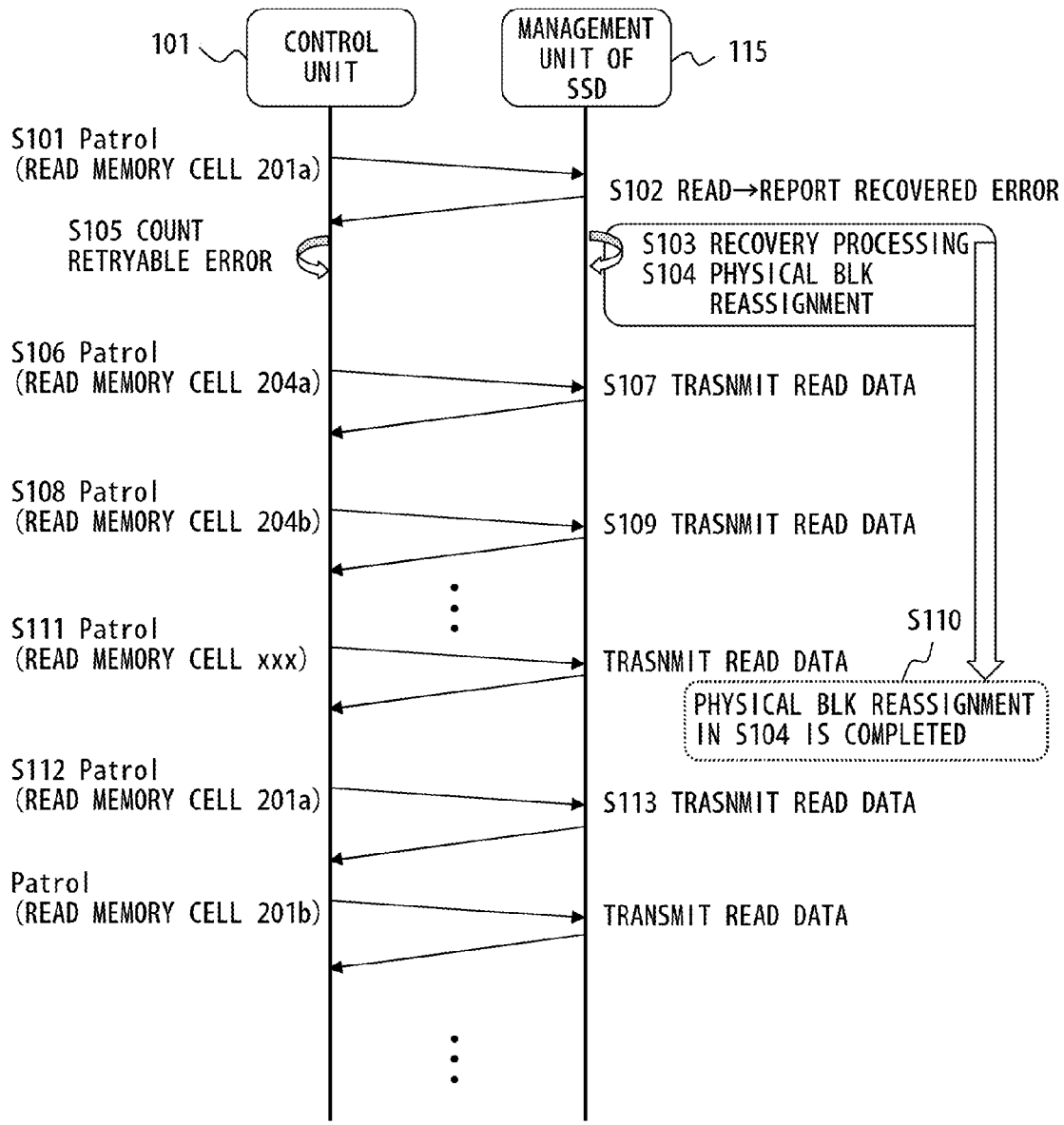
FIG. 3 is a sequence diagram explaining an example of normality diagnosis processing related to embodiment 1.

FIG. 3 is a sequence diagram explaining an example of the normality diagnosis processing related to embodiment 1. The same storage apparatus as that in FIG. 1 is used for the description of the sequence diagram in FIG. 3. The control unit 101 specifies the head address of the memory cell 201a of the block 111a, and notifies the management unit 115 of a request to read out the data held by the memory cell that includes the specified address (step S101). The management unit 115 reads out the data in the memory cell 201a in the cache area 116. In addition, the management unit 115 tries to read out A2 divided from the AA that is the original data of A1 in the cache area 116 in order to maintain the consistency of the RAID; however, the management unit cannot read out the A2 data from the block 11b, because the block 111b is faulty. The management unit 115 notifies the control unit 101 that a retryable error has occurred (step S102). The management unit 115 restores the data of the faulty block (step S103). The management unit 115 arranges the restored data in the backup block 11g (step S104). The control unit 101 counts the occurrences of the retryable error (step S105). Here, S103 to S104 and S105 are performed in parallel.

The control unit 101 skips the normality diagnosis of the group that includes the faulty block 111b, and sets a memory cell of the group other than the skipped group as a target for the normality diagnosis. In order to continue the normality diagnosis, the control unit 101 specifies the head address of the memory cell 204a of the block 111d, and notifies the management unit 115 of a request to read out the data held by the memory cell that includes the specified address (step S106). The management unit 115 reads out the data from the memory cell that includes the specified address, and transmits the data to the control unit 101 (step S107). The control unit 101 specifies the head address of the memory cell 204b of the block 111d, and notifies the management unit 115 of a request to read out the data held by the memory cell that includes the specified address (step S108). The management unit 115 reads out data from the memory cell that includes the specified address, and transmits the data to the control unit 101 (step S109).

The restoration of data and the arrangement of the restored data in the backup block 111g, which are processing in S104, are completed (step S110). The control unit 101 completes the normality diagnosis of all the blocks of the group other than the group subjected to skip processing (step S111). Here, S110 and S111 may be in reverse order. The next S112 processing is executed after completion of S110 and S111.

The control unit 101 performs the normality diagnosis on the group subjected to skip processing. The control unit 101 specifies the head address of the memory cell 201a of the block 111a, and notifies the management unit 115 of the request to read out the data held by the memory cell that includes the specified address (step S112). The management unit 115 reads out the data from the memory cell that includes the specified address and transmits it to the control unit 101 (step S113). The control unit 101 repeats steps S112 and S113, and when the normality diagnosis of all the blocks 111 is completed, the normality diagnosis processing is terminated.

Modification Example of Normality Diagnosis

In normality diagnosis processing related to embodiment 2, after restored data is arranged in the backup block due to a retryable error, continuing normality confirmation processing is interrupted, and the normality diagnosis of the group for which the normality diagnosis was skipped is performed.

Hereinafter, an example of the normality diagnosis processing related to embodiment 2 when the block 111b is faulty will be described in order. The normality diagnosis related to embodiment 2 is processing that is executed after the processing (A1) to (A6) of the normality diagnosis related to embodiment 1. The same storage apparatus as that in FIG. 1 is used for the description of the normality diagnosis processing related to embodiment 2.

(B1) The control unit 101 skips the normality diagnosis of the group that includes the faulty block 111b. The control unit 101 continues the normality diagnosis from the block 111d of the group that does not include the faulty block 111b. For example, the control unit 101 sequentially specifies the head addresses of the memory cells in order of the memory cell 204a, the memory cell 204b, etc., and gives the notification of a request to read out the data held by the memory cell that includes the specified address. The management unit 115 transmits to the control unit 101 the data of the memory cell that includes the specified address. The control unit 101 determines that the memory cell that includes the specified address is normal. In addition, the control unit 101, every time it receives data from the management unit 115, notifies the management unit 115 of a request to confirm whether or not the arrangement of the restored data in the backup block 111g is completed.

(B2) When the arrangement of the restored data in the backup block 111g is completed, the control unit 101 interrupts the normality diagnosis processing currently being executed, and performs the normality diagnosis on the group for which the normality diagnosis processing was skipped.

(B3) The normality diagnosis targeted at the group for which the normality diagnosis was skipped is completed. The control unit 101 resumes the interrupted normality diagnosis.

(B4) The control unit 101 determines whether or not the normality diagnosis of all the blocks 111 is completed. When the normality diagnosis of all the blocks 111 is completed, the control unit 101 terminates the normality diagnosis processing.

Figure 4A:
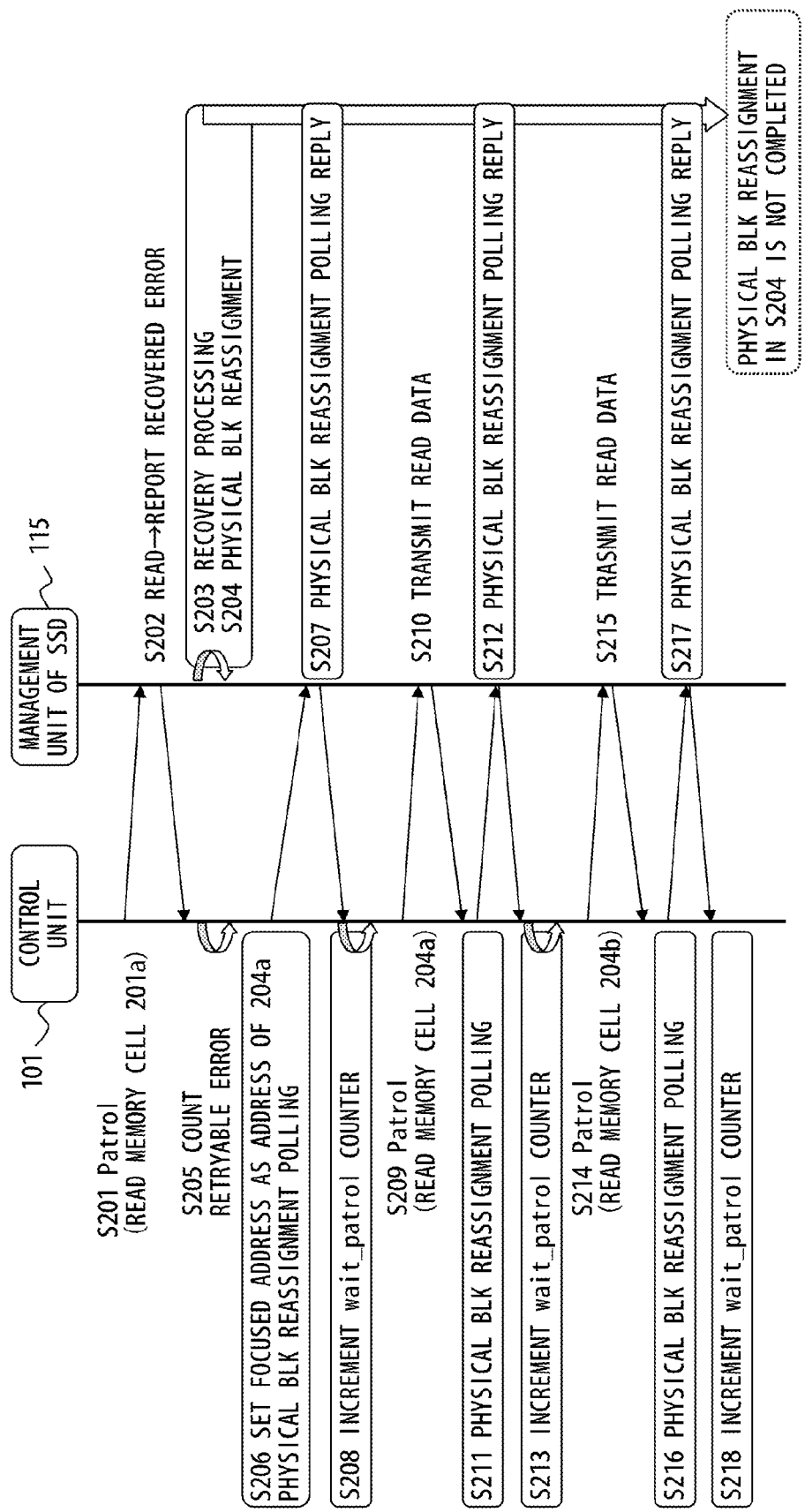
FIG. 4A is a sequence diagram explaining an example of normality diagnosis processing related to embodiment 2.
Figure 4B:
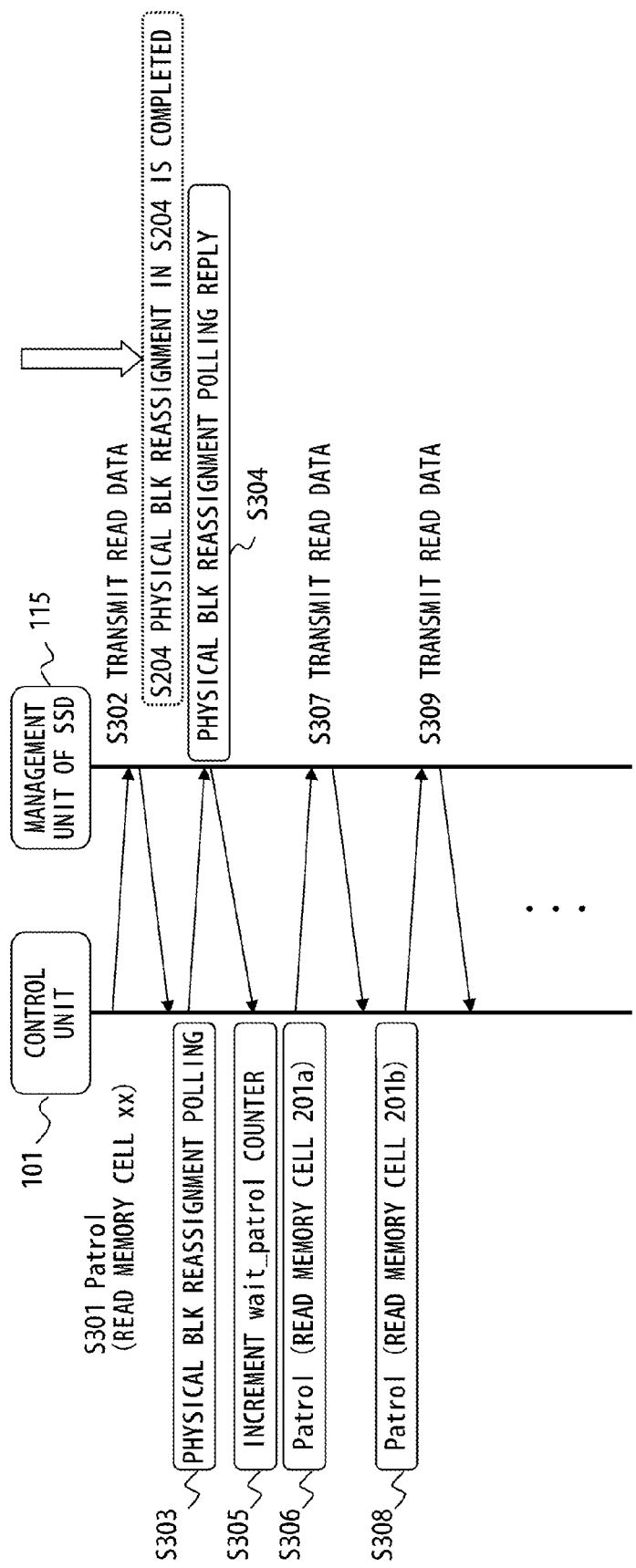
FIG. 4B is a sequence diagram explaining an example of normality diagnosis processing related to embodiment 2.

FIGS. 4A and 4B are each a sequence diagram explaining an example of the normality diagnosis processing related to embodiment 2. The same storage apparatus as that in FIG. 1 is used for the description of the sequence diagrams in FIGS. 4A and 4B. FIG. 4A is an example of the case in which the normality processing is initiated with respect to the SSD. The control unit 101 specifies the head address of the memory cell 201a of the block 111a, and notifies the management unit 115 of the request to read out the data held by the memory cell that includes the specified address (step S201). The management unit 115 reads out the data in the memory cell 201a in the cache area 116. In addition, the management unit 115 tries to read out A2 divided from AA, which is the original data of A1, in the cache area 116 in order to maintain the consistency of the RAID; however, since the block 111b is faulty, the management unit cannot read out the A2 data from the block 111b. The management unit 115 notifies the control unit 101 that a retryable error has occurred (step S202). The management unit 115 restores the data of the faulty block (S203). The management unit 115 arranges the restored data in the backup block 111g (step S204). The control unit 101 counts the occurrence of the retryable error (step S205). Here, S203 to S204 and S205 are executed in parallel.

The control unit 101 skips the normality diagnosis of the group that includes the faulty block. The control unit 101 sets the head address of the memory cell 204a of the block 111d as the focused-on address that is the address of the memory cell that is the next target for the normality diagnosis. In addition, the control unit 101 transmits to the management unit 115 the request to confirm whether or not the arrangement of the data in the backup block 111g in S204 is completed (step S206). The management unit 115 notifies the control unit 101 that the arrangement of the data in the backup block 111g is not completed, as a response to the confirmation request from the control unit 101 (step S207). The control unit 101 adds 1 to the count of wait_patrol (step S208).

The control unit 101 skips the normality diagnosis of the group that includes the faulty block 111b, and performs the normality diagnosis on the memory cells of the group other than the group for which the normality diagnosis was skipped. In order to continue the normality diagnosis, the control unit 101 specifies the head address of the memory cell 204a of the block 111d, and notifies the management unit 115 of a request to read out the data held by the memory cell that includes the specified address (step S209). The management unit 115 reads out the data from the memory cell that includes the specified address, and transmits the data to the control unit 101 (step S210). The control unit 101 transmits to the management unit 115 the request to confirm whether or not the arrangement of the data in the backup block 111g in S204 is completed (step S211). The management unit 115 notifies the control unit 101 that the arrangement of the data in the backup block 111g is not completed, as a response to the confirmation request from the control unit 101 (step S212). The control unit 101 adds 1 to the count of wait_patrol (step S213). The control unit 101 specifies the head address of the memory cell 204b of the block 111d, and notifies the management unit 115 of a request to read out the data held by the memory cell that includes the specified address (step S214). The management unit 115 reads out the data from the memory cell that includes the specified address, and transmits the data to the control unit 101 (step S215). The control unit 101 transmits to the management unit 115 the request to confirm whether or not the arrangement of the data in the backup block 111g in S204 is completed (step S216). As a response to the confirmation request from the control unit 101 (step S217), the management unit 115 notifies the control unit 101 that the arrangement of the data in the backup block 111g is not completed. The control unit 101 adds 1 to the count of wait_patrol (step S218).

After S218, the control unit 101 and the management unit 115 continue the normality diagnosis as in S209 to S210 and S214 to S215 until the processing for arranging the data in the backup block 111g in S204 is completed. In addition, every time the data of the memory cell that includes the specified address is received from the management unit 115, the control unit 101 and the management unit 115 communicate with each other in order to confirm whether or not the arrangement of the data in the backup block 111g has been completed in the same manner as in S211 to S213 and S216 to S218.

FIG. 4B is a sequence diagram explaining an example of normality diagnosis processing after completion of data arrangement in the backup block. The control unit 101 specifies the head address of a memory cell XX, and notifies the control unit 115 of a request to read out the data held by the memory cell that includes the specified address (step S301). The memory cell XX is a memory cell that is subjected to the normality diagnosis that continues after S218, when the arrangement of the data in the backup block 111g is completed. The control unit 115 reads out the data from the memory cell that includes the specified address, and transmits the data to the control unit 101 (step S302). The control unit 101 transmits the request to confirm whether the arrangement of the data in the backup block 111g in S204 is completed (step S303). As a response to the confirmation request from the control unit 101, the management unit 115 notifies the control unit 101 that the arrangement of the data in the backup block 111g is completed (step S304). The control unit 101 adds 1 to the count of wait_patrol (step S305).

The control unit 101 interrupts the normality diagnosis that has been being performed since S209. The control unit 101 performs the normality diagnosis on the group subjected to skip processing. The control unit 101 specifies the head address of the memory cell 201a of the block 111a, and notifies the management unit 115 of a request to read out the data held by the memory cell that includes the specified address (step S306). The management unit 115 reads out the data from the memory cell that includes the specified address, and transmits the data to the control unit 101 (step S307).

The control unit 101 specifies the head address of the memory cell 201b of the block 111a, and notifies the management unit 115 of a request to read out the data held by the memory cell that includes the specified address (step S308). The management unit 115 reads out the data from the memory cell that includes the specified address, and transmits the data to the control unit 101 (step S309).

After S309, the control unit 101 and the management unit 115 continue the normality diagnosis in the same manner as in S306 to S308 until the normality diagnosis reaches the address set as the focused-on address.

Figure 5:
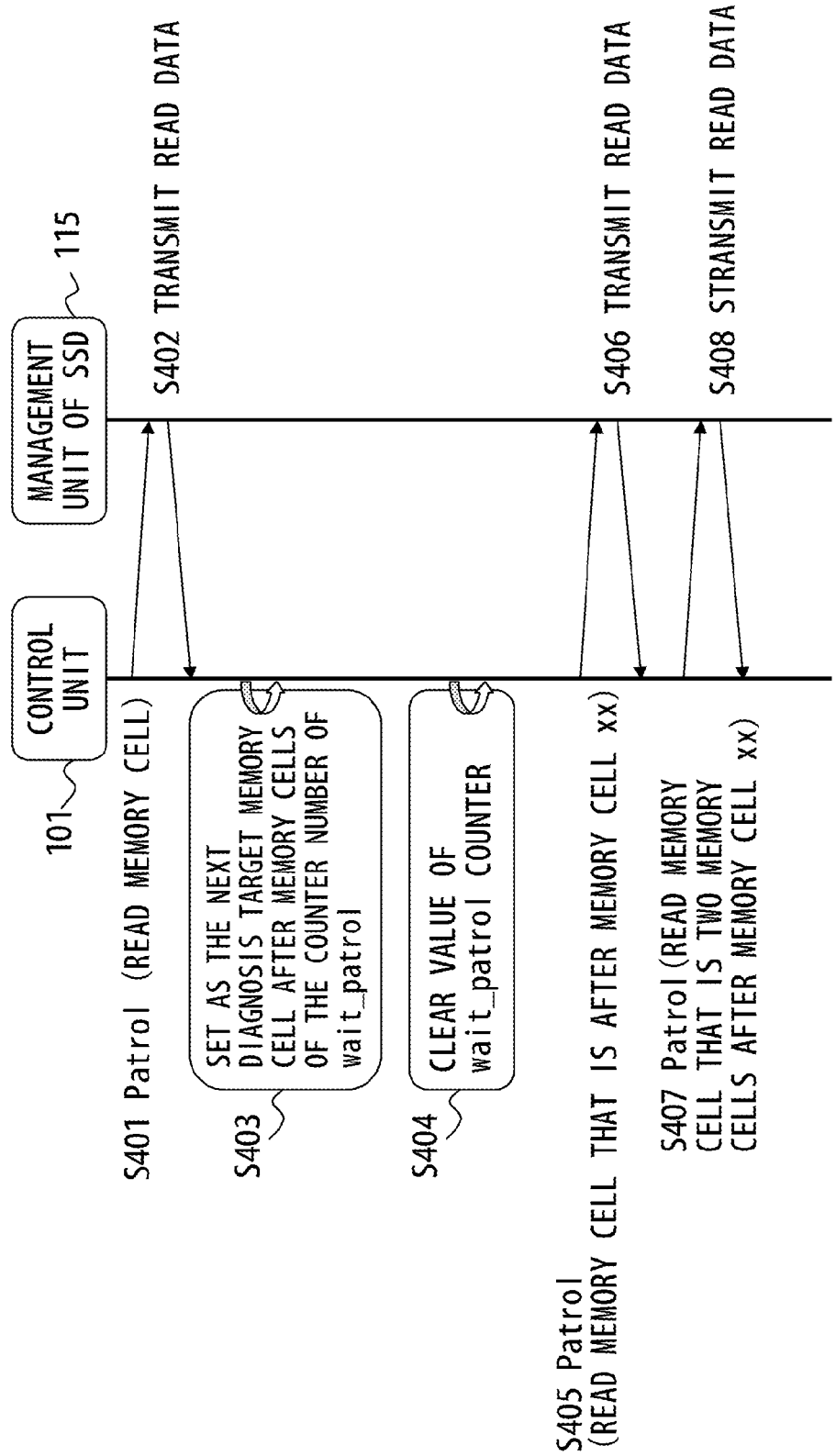
FIG. 5 is a sequence diagram explaining an example of processing for resuming an interrupted normality diagnosis.

FIG. 5 is a sequence diagram explaining an example of processing for resuming the interrupted normality diagnosis. The sequence diagram in FIG. 5 illustrates processing that is executed after all the normality diagnoses of the group for which the normality diagnosis was skipped are completed. The same storage apparatus as that in FIG. 1 is used for the description of the sequence diagram in FIG. 5. The control unit 101 specifies the head address of the last memory cell of the group for which the normality diagnosis was skipped, and notifies the management unit 115 of a request to read out the data held by the memory cell that includes the specified address (step S401). The management unit 115 reads out the data from the memory cell that includes the specified address, and transmits the data to the control unit 101 (step S402). The control unit 101 sets as the next diagnosis target the memory cell after the memory cells of the count number of wait_patrol from the last memory cell of the group for which the normality diagnosis was skipped (step S403). The control unit 101 clears the count value of wait_patrol (step S404). Here, the memory cell after the memory cells of the count number of wait_patrol from the last memory cell of the group for which the normality diagnosis was skipped is the next memory cell of the memory cell XX.

The control unit 101 specifies the head address of the next memory cell of the memory cell XX, and notifies the management unit 115 of a request to read out the data held by the memory cell that includes the specified address (step S405). The management unit 115 reads out the data from the memory cell that includes the specified address, and transmits the data to the control unit 101 (step S406). The control unit 101 specifies the head address of the memory cell after two memory cells from the memory cell XX, and notifies the management unit 115 of a request to read out the data held by the memory cell that includes the specified address (step S407). The management unit 115 reads out the data from the memory cell that includes the specified address, and transmits the data to the control unit 101 (step 408). If the normality diagnosis of all the blocks 111 is completed, the control unit 101 terminates the normality diagnosis processing.

Figure 6A:
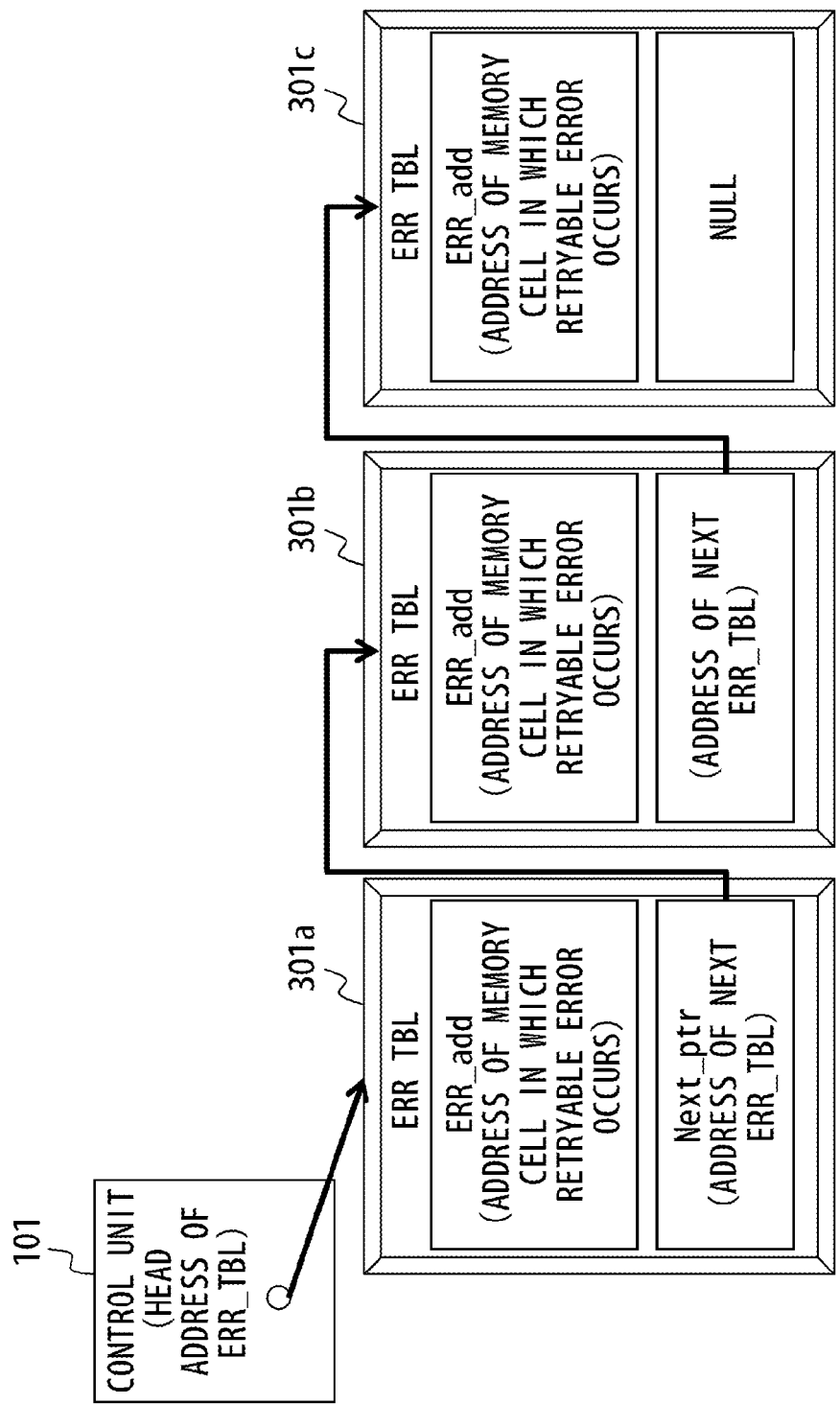
FIG. 6A is a diagram explaining examples of information tables used for the normality diagnosis.
Figure 6B:
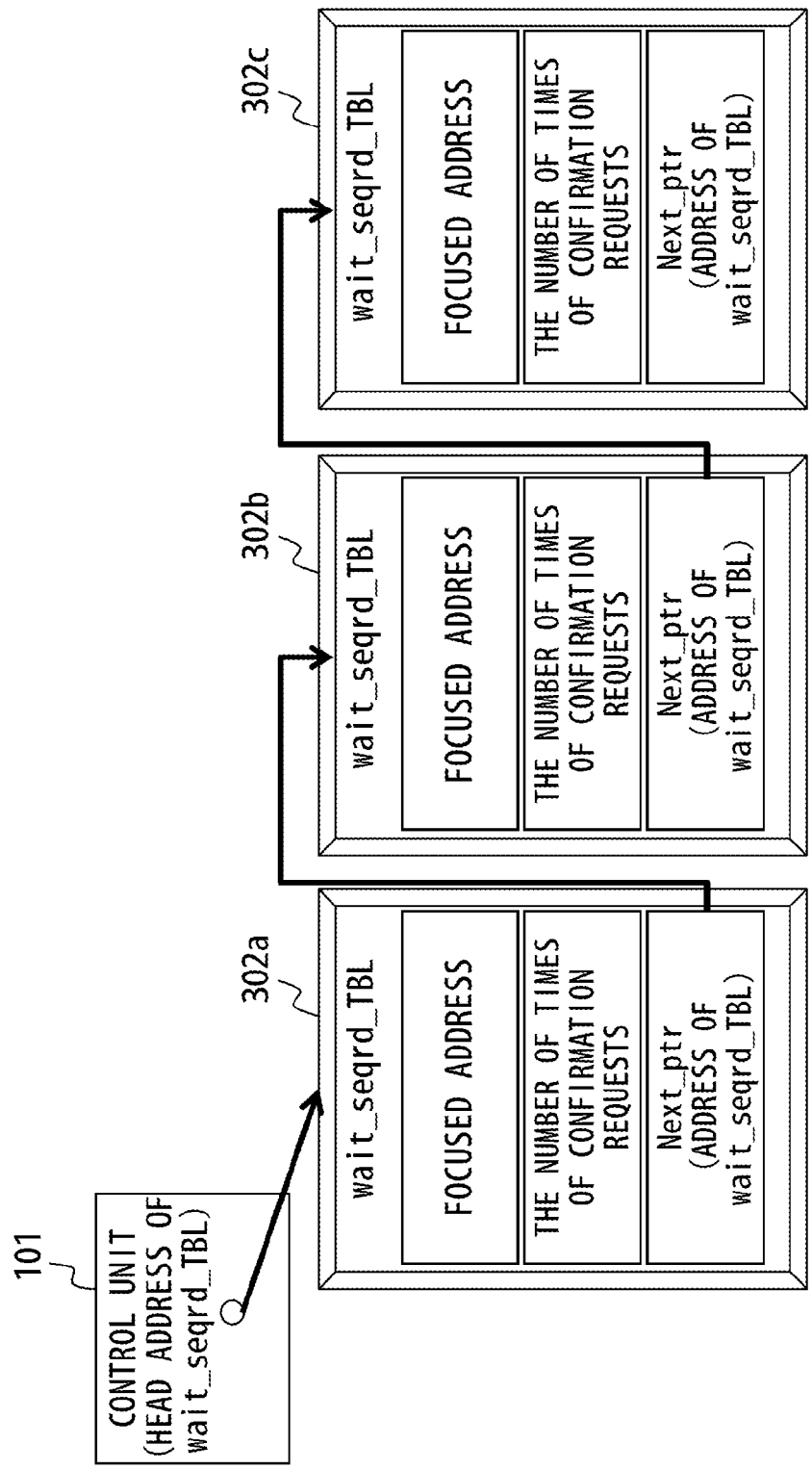
FIG. 6B is a diagram explaining examples of information tables used for the normality diagnosis.

FIGS. 6A and 6B are each a diagram explaining an example of an information table used for the normality diagnosis. FIG. 6A is the information table used when a retryable error occurs. The information table used when a retryable error occurs holds the information of the head address of a memory cell in which a retryable error is detected, and the address of the information table used when another retryable error occurs, while associating them with each other.

When the control unit 101 receives the notification of a first retryable error, the control unit creates an error table (ERR_TBL) 301a. The error table 301a holds the head address of the memory cell in which the retryable error is detected. In the case in which the control unit 101 receives the notification of the second retryable error, the control unit creates an error table 301b. The case of detecting the second retryable error is when a failure occurs in a block different from the block in which the first retryable error occurs. The control unit 101 causes the error table 301a to store the address information of the error table 301b, and further causes the error table 301b to hold the head address of the memory cell in which the second retryable error is detected. In the case in which the control unit 101 receives the notification of the retryable error of the third time, the control unit creates an error table 301c. The case of detecting the retryable error of the third time is when a failure occurs in a block different from the blocks in which the first and second retryable errors occur. The control unit 101 causes the error table 301b to store the address information of the error table 301c, and further causes the error table 301c to hold the head address of the memory cell in which the retryable error of the third time is detected. When a greater plurality of the retryable errors are detected, the control unit 101 creates error tables 301 for the number of the retryable errors. When the normality diagnosis of the block that includes the memory cell corresponding to the address held in the error table 301 is completed, the control unit 101 deletes the error table 301.

FIG. 6B illustrates information tables used for confirming whether or not the arrangement of data in the backup block is completed. The information table used for confirming whether or not the arrangement of the data in the backup block is completed holds a focused-on address and the number of confirmation requests while associating them with each other. In addition, the information table used for confirming whether or not the arrangement of the data in the backup block has been completed holds the address information of another information table used for confirming whether or not the arrangement of data in the backup block has been completed.

The control unit 101 creates a wait_seqrd table 302a when requesting confirmation for the first time after the first retryable error. The wait_seqrd table 302a holds the head address of the memory cell for which the address is set as the focused-on address in S206. The control unit 101 adds the number of times confirmation requests are made for each confirmation request after the first retryable error, and causes the wait_seqrd table 302a to hold the number of times confirmation requests are made.

Next, the control unit 101 creates a wait_seqrd table 302b when requesting confirmation for the first time with respect to data movement to the backup block based on the second retryable error. The control unit 101 causes the wait_seqrd table 302a to store the address information of the wait_seqrd table 302b. The wait_seqrd table 302b holds the head address of the focused-on address set by the second retryable error. In addition, the control unit 101 causes the wait_seqrd table 302b to hold the number of times the confirmation requests are made for each confirmation request with respect to the data movement to the backup block based on the second retryable error.

Next, the control unit 101 creates a wait_seqrd table 302c when requesting confirmation for the first time with respect to the data movement to the backup block based on the retryable error of the third time. The control unit 101 causes the wait_seqrd table 302b to store the address information of the wait_seqrd table 302c. The wait_seqrd table 302c holds the head address of the focused-on address set by the retryable error of the third time. In addition, the control unit 101 adds the number of times the confirmation requests are made for each confirmation request with respect to the data movement to the backup block based on the retryable error of the third time, and causes the wait_seqrd table 302c to hold the number of times the confirmation requests are made. When the retryable errors are detected a greater plurality of times, the control unit 101 creates wait_seqrd tables 302 for the number of the retryable errors. When the wait_seqrd table 302 is used due to a resuming of a patrol read in the same manner as in S405, the control unit 101 deletes the table that was used.

Example of Normality Diagnosis Processing used for SSD

Figure 7:
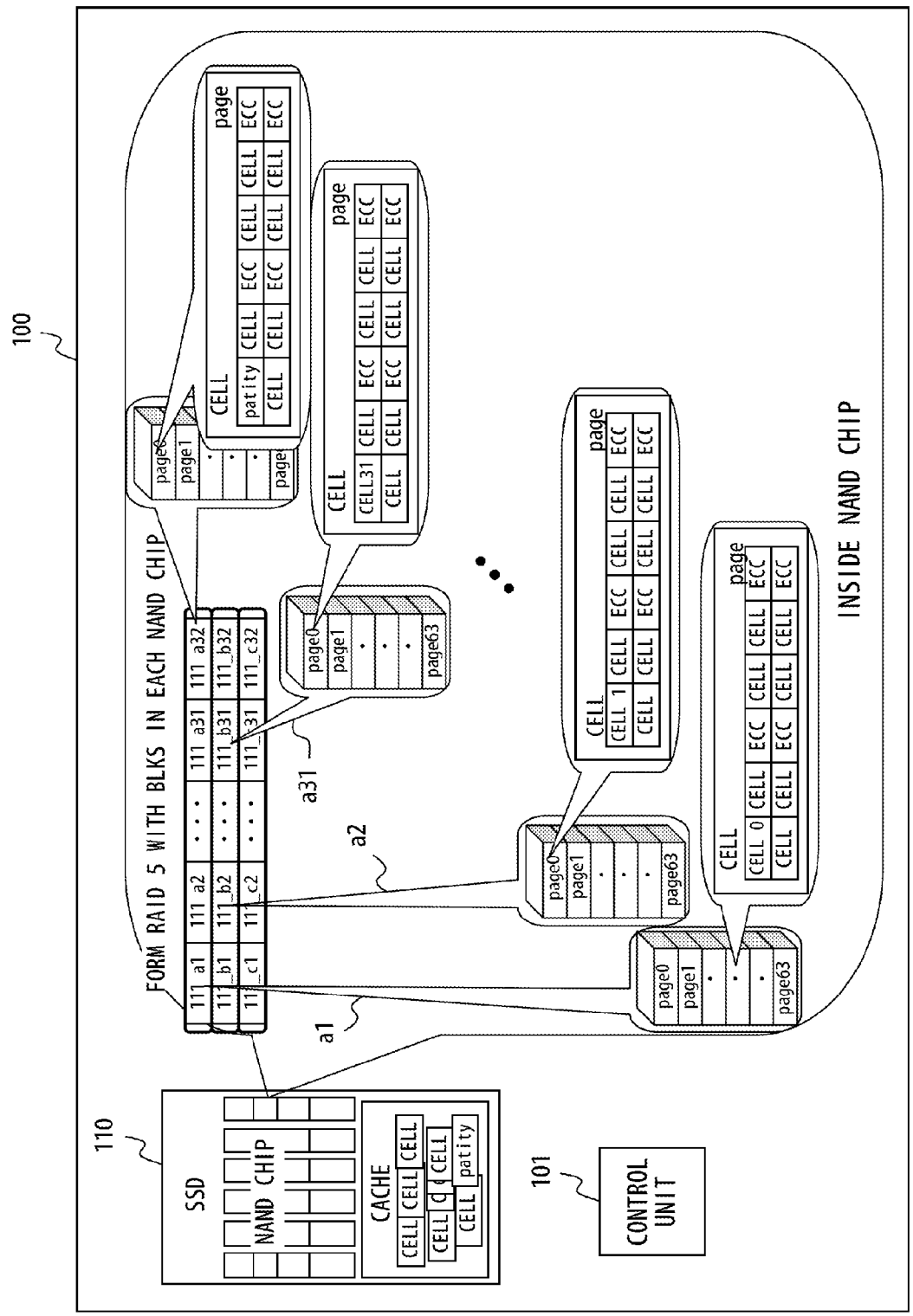
FIG. 7 is a diagram explaining processing for performing the normality diagnosis on a head block for each group.

FIG. 7 is a diagram explaining an example of processing for performing the normality diagnosis on the head block for each group. In the normality diagnosis processing illustrated in FIG. 7, the head block is diagnosed for each group that includes the plurality of blocks, and the diagnosis on the remaining blocks is not performed. When a retryable error is detected, the normality diagnosis processing illustrated in FIG. 7 introduces the examples of the normality diagnosis described in embodiment 1 and embodiment 2.

The SSD 110 in FIG. 7 includes the plurality of blocks 111 and the cache area 116. The SSD 110 includes the group of the RAID 5 (31+1) that includes the blocks $111_{a1}$ to $111_{a32}$. Similarly, the blocks $111_{bb1}$ to $111_{b32}$ and the blocks $111_{c1}$ to $111_{c32}$ are the groups of the RAID 5 (31+1). In the RAID 5 (31+1), one piece of data is divided into 31 equal pieces, and for example, they are held in the blocks $111_{a1}$ to $111_{a31}$. In the SSD 110 in FIG. 7, one piece of data is divided and held in the memory cells 0 to 31. Each group of the RAID 5 (31+1) holds parity.

When the normality diagnosis is performed on a storage medium such as the SSD 110 that has a plurality of groups of the RAID 5 (31+1), the control unit 101 may diagnose at least one block for each RAID group. As one example, when the data in the memory cell 0 of the block $111_{a1}$ is read out, the management unit 115 reads out data divided from the original data of the data stored in the memory cell 0 in order to confirm the consistency of the RAID. The management unit 115 reads out the data of the memory cells 1 to 31 and the parity in the cache area 116 of the SSD 110.

When the normality diagnosis on the block $111_{a1}$ is terminated, and next, the normality analysis is performed on the block $111_{b1}$, the control unit 101 diagnoses the memory cell 1. In the case in which the control unit 101 specifies the head address of the memory cell 1, the data of the memory cell 1 is already read out in the cache area 116. As a result, even if the management unit 115 receives a request to read out the data of the memory cell 1, the management unit does not read out the data from the memory cell 1, and reads out the data from the cache area 116 instead. Thereafter, when the control unit 101 specifies the address of each of the memory cells 2 to 31, the management unit 115 reads out each piece of data from the cache area 116. Therefore, the read-out request from the control unit 101 that specifies the memory cells 1 to 31 and the parity does not perform the normality diagnosis on the block that is a storage medium.

When the management unit 115 receives the read-out request of the memory cell 0 from the control unit 101, the management unit reads out the memory cell 0 in the cache area 116, and reads out the data of the memory cells 1 to 31 and the parity in the cache area 116. Therefore, the control unit 101 gives the read-out request to one memory cell, which results in the normality diagnosis being performed on the block 111 that holds the data of the memory cells 0 to 31 and the parity. As a result, when a normality diagnosis is performed on a storage medium that has a plurality of RAID 5 groups, the control unit 101 may diagnose at least one block for each RAID 5 group.

Embodiment 1, embodiment 2, and the example of the processing for diagnosing at least one block for each group are not limited to the normality diagnosis. Embodiment 1, embodiment 2, and the example of the processing for diagnosing at least one block for each group can be applied to processing that accompanies reading operations in all the pages and the blocks in the SSD for each memory cell. The examples of such processing include rebuild processing and copy back. In the rebuild processing, a reading operation for each memory cell is performed when reading out data from a mirror of a faulty SSD in RAID 1, RAID 1+0, etc. In the copy back processing, a reading operation for each memory cell is performed when copying data from another storage medium in the case in which a faulty SSD in a RAID is replaced.

Figure 8:
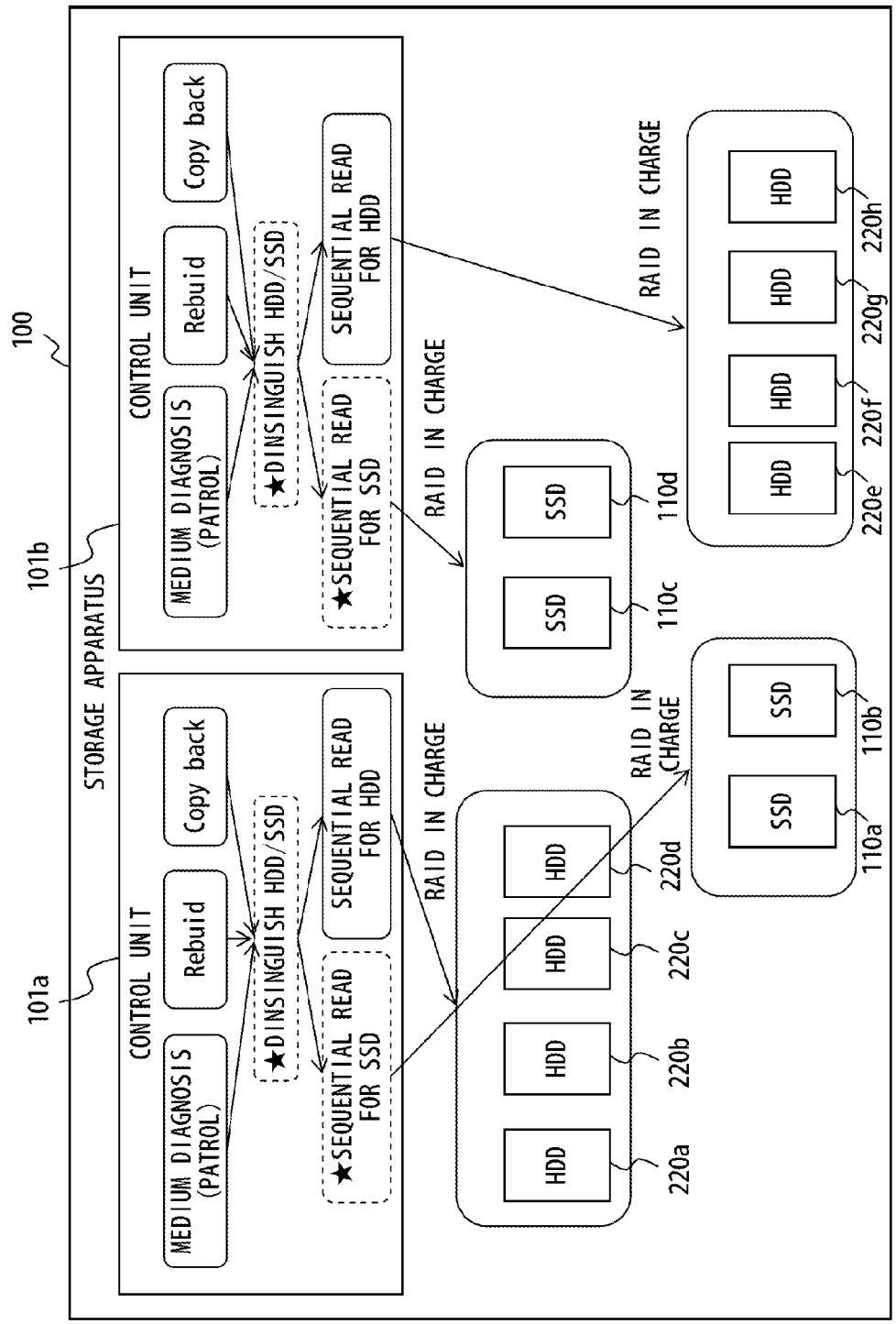
FIG. 8 is a diagram explaining an example of a storage apparatus that includes an SSD and an HDD.

FIG. 8 is a diagram explaining an example of the storage apparatus that includes the SSDs and the HDDs. The storage apparatus 100 includes a control unit 101a and a control unit 101b, the SSDs 110 (110a to 110d), and the HDDs 220 (220a to 220h).

The control unit 101a controls processing targeted at the HDDs 220a to 220d, and the SSDs 110a to 110b. The control unit 101b controls processing targeted at the HDDs 220e to 220h, and the SSDs 110c to 110d. The control unit 101 is, for example, a RAID controller. The control unit 101 controls processing such as the normality diagnosis, rebuild, and copy back by way of communication with an outside device. When the control unit 101 performs processing such as the normality diagnosis, the rebuild, and the copy back, the control unit determines whether the processing target is the HDD 220 or the SSD 110. Whether the processing target is the HDD 220 or the SSD 110 is determined by specifying the type of the medium by using a SCSI command, for example. When the processing target is the HDD 220, the control unit 101 executes processing such as the normality diagnosis, the rebuild, and the copy back. When the processing target is the SSD 110, the control unit 101 executes processing for reading the head block for each memory cell, with respect to each group that includes the plurality of blocks. When the processing target is the SSD 110 and a failure is detected therein, the control unit 101 executes processing in embodiments 1 and 2.

Figure 9A:
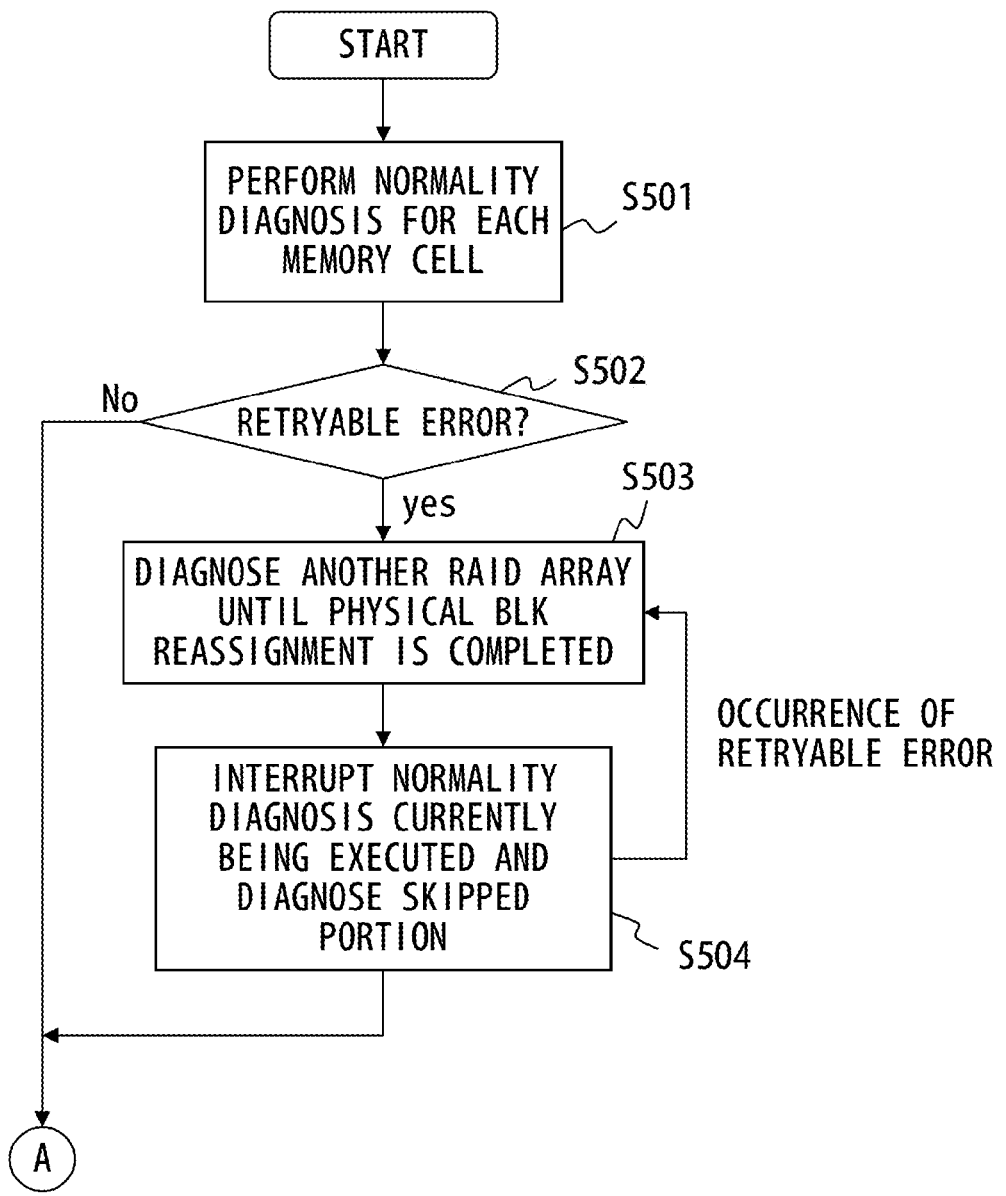
FIG. 9A is a flowchart explaining an example of normality diagnosis processing used for the SSD.
Figure 9B:
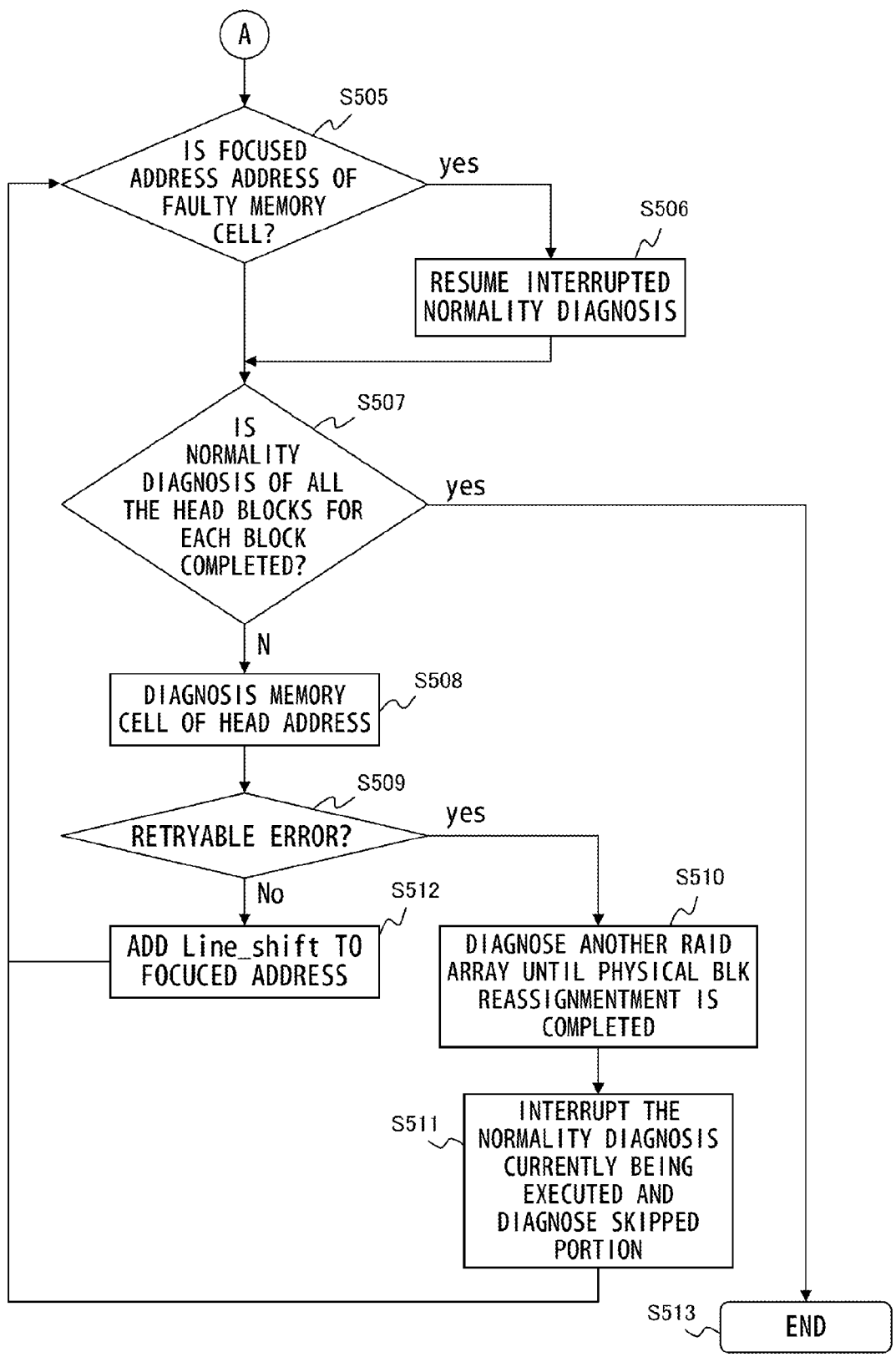
FIG. 9B is a flowchart explaining an example of normality diagnosis processing used for the SSD.

FIGS. 9A and 9B are each a flowchart explaining an example of the normality diagnosis processing used for the SSD. The same storage apparatus as that in FIG. 1 is used for description of the flowcharts in FIGS. 9A and 9B. The control unit 101 executes the normality diagnosis for each memory cell, targeted at the head block for each group (step S501). The control unit 101 determines whether or not the response of the normality diagnosis from the management unit 115 is a notification of a retryable error (step S502). The control unit 101 skips the normality diagnosis of the group that includes a faulty block, and continues the normality diagnosis of the group that does not include the faulty block until the arrangement of restored data in the backup block is completed (YES in steps S503 and S502). When the arrangement of the restored data in the backup block is completed, the control unit 101 interrupts the normality diagnosis processing currently being executed, and performs the normality diagnosis of the group for which the normality diagnosis was skipped. (step S504). When a retryable error is detected in S504, the control unit 101 returns the processing to S504.

The control unit 101 determines whether or not the head address information of a faulty memory cell is set in the focused-on address (No insteps S505 and S502). The control unit 101 resumes the normality diagnosis interrupted in S504 (YES is steps S506 and S505). The control unit 101 determines whether or not all of the normality diagnoses targeted at the head block for each group are completed (No is steps S507 and S505). The control unit 101 performs the normality diagnosis on the memory cell having the address specified by the focused-on address (NO in steps S508 and S507). The control unit 101 determines whether or not the response of the normality diagnosis from the management 115 is a notification of a retryable error (step S509). The control unit 101 skips the normality diagnosis of the group that includes the faulty block, and continues the normality diagnosis of the group that does not include the faulty block until the arrangement of the restored data in the backup block is completed (YES in steps S510 and S509). When the arrangement of the restored data in the backup block is completed, the control unit 101 interrupts the normality diagnosis currently being executed, and performs the normality diagnosis of the group for which the normality diagnosis processing is skipped (step S511). When S511 is terminated, the control unit 101 returns the processing to S505. The control unit 101 sets the head address of the next memory cell as the focused-on address (NO insteps S512 and S509). The control unit 101 determines the head address of the next memory cell by a command such as Line_shift. When S512 is terminated, the control unit 101 returns the processing to S505. The control unit 101 terminates the normality diagnosis processing (YES in steps S513 and S507).

FIGS. 10A and 10B are each a flowchart explaining an example of the normality diagnosis processing performed until the arrangement of restored data in the backup block is completed. The flowcharts in FIGS. 10A and 10B are each a flowchart explaining in detail the processing in S503 in FIG. 9A. The control unit 101 counts the number of notifications of the retryable error from the management unit 115 (step S601). The control unit 101 determines whether or not the number of notifications of the retryable error has reached a predetermined threshold value (step S602). The control unit 101 determines that the SSD is faulty, and suspends the use of the faulty SSD (YES insteps S603 and S602).

The control unit 101 stores the information on the head address of the memory cell in which the retryable error is detected in an ERR_TBL (NO in steps S604 and S602). The control unit 101 determines whether or not the arrangement of the restored data in the backup block is completed (step S605). The completion of the restored data in the backup block is determined by referring to, for example, a log of the SSD. The control unit 101 sets the head address of the head block of the next address as the focused-on address (step S606). The control unit 101 performs the normality diagnosis on the memory cell having the address specified by the focused-on address (step S607). The control unit 101 determines whether or not the response of the normality diagnosis from the management unit 115 is a notification of the retryable error (step S608). The control unit 101 repeats the processing from S602 (YES in step S608). The control unit 101 adds 1 to the number of the requests for confirming whether or not the arrangement of the data in the backup block is completed (NO in steps S609 and S608). The control unit 101 sets the head address of the next memory cell as the focused-on address (step S610). The control unit 101 performs the normality diagnosis on the memory cell having the address specified by the focused-on address (step S611). The control unit 101 determines whether or not the response of the normality diagnosis from the management unit 115 is a notification of the retryable error (step S612). The control unit 101 repeats the processing from S602 (YES in step S612). The control unit 101 determines whether or not the arrangement of the restored data in the backup block is completed (NO in steps S613 and S612). The control unit 101 repeats the processing from S609 (NO in step S613). The control unit 101 clears the value set as the focused-on address (YES in steps S614 and S613). The control unit 101 terminates the normality diagnosis processing that is executed until the arrangement of the restored data in the backup block is terminated.

FIG. 11 is a flowchart explaining an example of processing for performing the normality diagnosis on a group for which the normality diagnosis was skipped. The control unit 101 performs the normality diagnosis at first on a memory cell in which the retryable error is detected by using the ERR_TBL (step S701). The control unit 101 determines whether or not the response of the normality diagnosis from the management unit 115 is a notification of the retryable error (step S702). The control unit 101 skips the normality diagnosis of the group that includes the faulty block, and continues the normality diagnosis of the group that does not include the faulty block until the arrangement of the restored data in the backup block is completed (YES in steps S703 and S702). The control unit 101 sets the memory cell that includes the head address of the next memory cell as the next diagnosis target (NO in steps S704 and S702). The control unit 101 determines whether or not all the diagnoses of the group for which the normality diagnosis was skipped are completed (step S705). The control unit 101 repeats the processing from S701 (NO is step S705). The control unit 101 determines that the ERR_TBL used in S701 does not have the address of another ERR_TBL (step S706). The control unit 101 selects another ERR_TBL and sets it as the next target for the normality diagnosis (step S707). When S707 is terminated, the control unit 101 repeats the processing from S701. The control unit 101 initializes the ERR_TBL (YES in steps S708 and S706). The control unit 101 executes processing from S505 when the processing in S708 is terminated.

As described above, in the method related to the embodiments, an error is detected once from the normality diagnosis on a group that includes a faulty block by skipping the normality diagnosis processing on the group that includes the block in which a failure is detected. As a result, even when a faulty block is diagnosed, since normality diagnoses are not performed a plurality of times on the faulty block, error detection is not performed a plurality of times on one block.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus comprising:
   an interface that inputs and output data to and from a storage device that includes a plurality of memory blocks that form a plurality of RAID (Redundant Array of Inexpensive Discs) groups, and further includes a backup block that is used as a backup of the plurality of memory blocks; and
   a processor that performs, via the interface, control for
   excluding a memory cell that belongs to a RAID group that includes a faulty memory block from a read-out target until restoration of the data of the faulty memory block and copying of the recovered data to the backup block are completed, when the memory cell included in the faulty memory block is selected as the read-out target from a plurality of memory cells included in each memory block in the storage device,
   selecting the memory cell of a group other than the RAID group that includes the faulty memory block, as the read-out target, and
   selecting the memory cell that belongs to the RAID group that includes the faulty memory block and a memory cell in the backup block, as the read-out target, when the restoration of the data of the faulty memory block and the copying of the restored data to the backup block are completed.

2. The storage control apparatus according to claim 1, wherein
   the processor selects the memory cell that belongs to the RAID group that includes the faulty memory block and the memory cell in the backup block as the read-out target, when processing for reading out the memory cells from among all the memory cells is completed, the memory cells being included in the group other than the RAID group having the faulty memory block, and when the copying of the restored data to the backup block is completed,
   when all the memory cells in the storage device are specified as the read-out targets.

3. The storage control apparatus according to claim 1, wherein
   the processor makes a memory cell included in one memory block a candidate for a read-out target for each RAID group,
   when all the memory cells in the storage device are specified as the read-out targets.

4. A storage control method comprising:
   excluding a memory cell, using a processor, that belongs to a RAID group that includes a faulty memory block from a read-out target until restoration of the data of the faulty memory block and copying of the restored data to the backup block are completed, when a storage control apparatus that sets as a read-out target a storage device that includes a plurality of memory blocks forming a plurality of RAID groups and that includes the backup block used as a backup of the plurality of memory blocks selects the memory cell included in the faulty memory block as the read-out target from the plurality of memory cells included in each memory block in the storage device,
   selecting a memory cell, using the processor, of the group other than the RAID group that includes the faulty memory block as the read-out target, and
   selecting, using the processor, the memory cell belonging to the RAID group that includes the faulty memory block and a memory cell in the backup block as the read-out targets when the restoration of the data of the faulty memory block and the copying of the restored data to the backup block are completed.

5. A non-transitory computer-readable recording medium having stored therein a storage control program causing a storage control apparatus that sets as a read-out target a storage device that includes a plurality of memory blocks forming a plurality of RAID groups and that further includes a backup block used as a backup of the plurality of memory blocks, to execute a process comprising:
   excluding a memory cell that belongs to the RAID group that includes a faulty memory block from the read-out target until restoration of the data of the faulty memory block and copying of the restored data to the backup block are completed, when the memory cell included in the faulty memory block is selected as the read-out target from the plurality of memory cells included in each memory block in the storage device;
   selecting a memory cell of the group other than the RAID group that includes the faulty memory block; and
   selecting the memory cell that belongs to the RAID group that includes the faulty memory block and a memory cell in the backup block as the read-out targets when the restoration of the data of the faulty memory block and the copying of the restored data to the backup block are completed.

* * * * *